INVENTORS
DARLO E. LIENEMANN
JOHN F. STUFFLEBEAM
ATTY

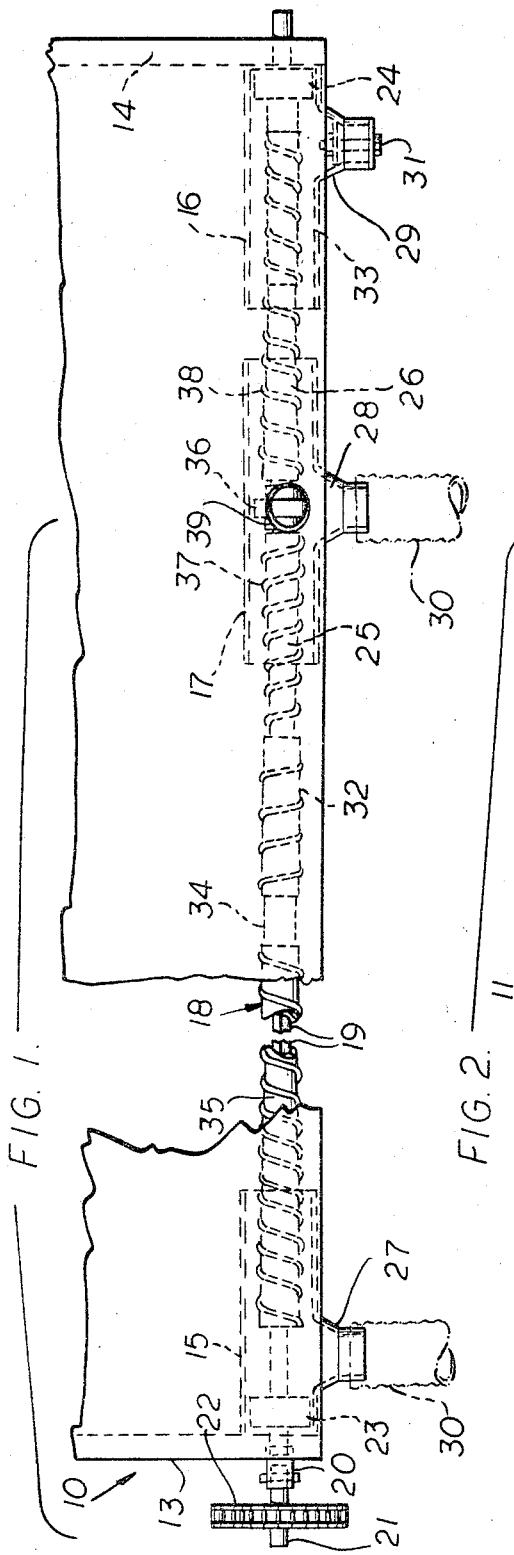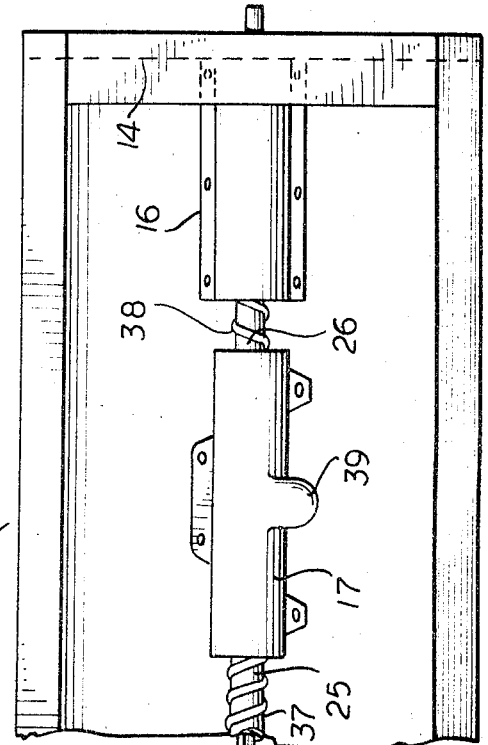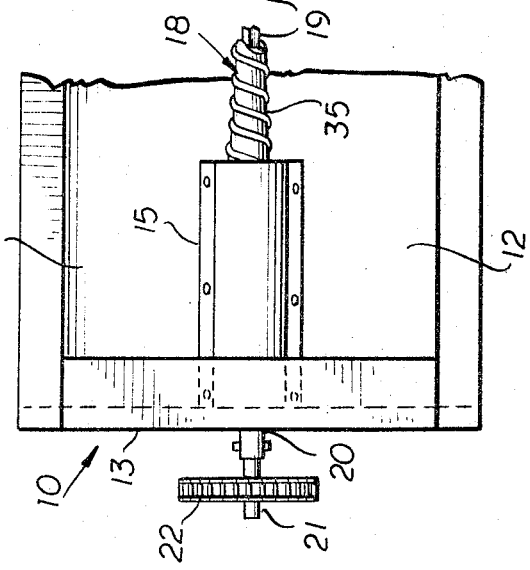

United States Patent Office 3,430,822
Patented Mar. 4, 1969

3,430,822
AUGER CENTERING DEVICE
Darlo E. Lienemann, Clarendon Hills, and John F. Stufflebeam, Hampton Park, Lockport, Ill., assignors to International Harvester Company, Chicago, Ill., a corporation of Delaware
Filed Dec. 30, 1966, Ser. No. 606,409
U.S. Cl. 222—412     4 Claims
Int. Cl. A01c *15/02, 15/08*

ABSTRACT OF THE DISCLOSURE

An agricultural fertilizer distributor or the like utilizing an elongated hopper to cover a wide area having several openings in the bottom from which the material is discharged and an auger extending the length of the hopper rotatable to feed the material to the openings. Since the auger is supported only at its ends, and modern farming practices require longer and longer hoppers and augers, the problem of having the auger sagging or being pushed upward by the material between its ends and interfering with its ability to move uniform quantities of fertilizer and the like to the discharge outlets required a solution. The present centering device consists of a roller mounted on the shaft at one of the outlets to avoid interfering with the flow of material and having a greater diameter than the shaft so that distortion of the shaft by fertilizer build-up is prevented.

---

This invention relates to agricultural implements and particularly to dispensers of fertilizer and like. More specifically, the invention concerns the wide type of fertilizer distributor utilizing a feed shaft extending the length of the hopper.

Modern farming practices require larger and larger implements, and in fertilizer dispensers of the type referred to, difficulties have been encountered with the elongated feed shaft due to the fact that it is supported only at its ends. Therefore, an object of this invention is the provision of an improved distributor for fertilizer and the like wherein means are provided for preventing distortion of the shaft due to pressure exerted against it by material building-upon around and particularly below the shaft.

Another object of the invention is the provision of novel means for preventing distortion of the feed shaft of a fertilizer distributor or the like wherein the shaft is surrounded in part, by a central housing and a centering roller or the like is mounted on the shaft in the housing and having a diameter greater than that of the shaft, the roller being engageable with the inner wall of the housing to prevent excessive build-up of material and distortion of the feed shaft.

Other objects and advantages of the invention will become clear from the following detailed description when read in conjunction with the accompanying drawings wherein:

FIGURE 1 is a diagrammatic elevational view, with parts removed, of a portion of a material distributing hopper having incorporated therein the features of this invention;

FIGURE 2 is a plan view of the structure shown in FIGURE 1;

Figure 3:
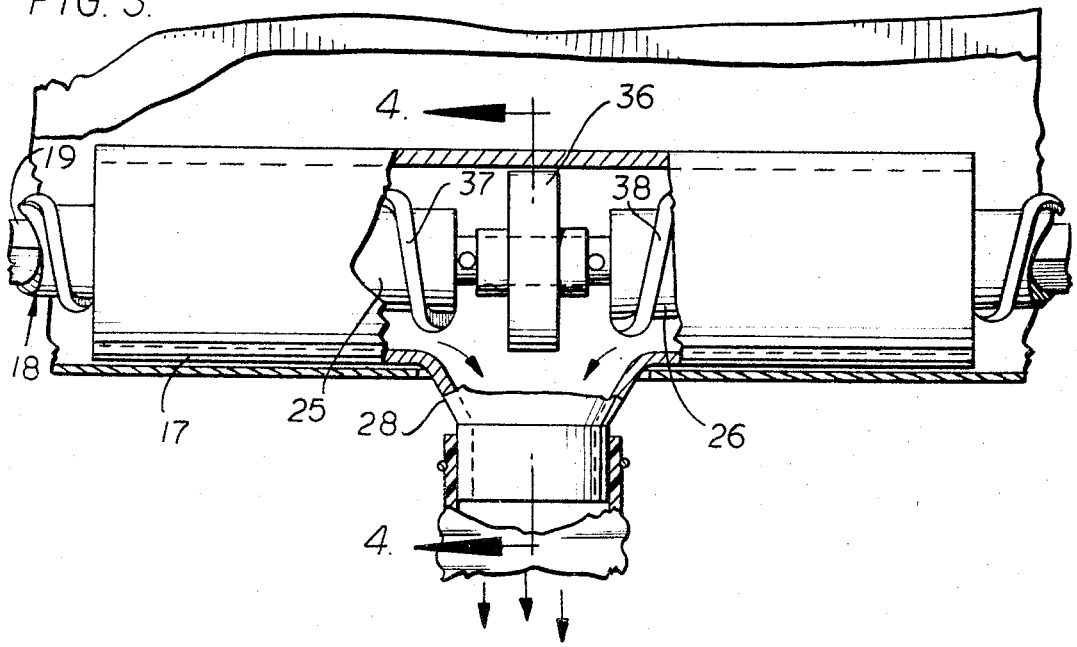
FIGURE 3 is an enlarged sectional detail of a portion of the structure shown in FIGURE 1.
Figure 4:
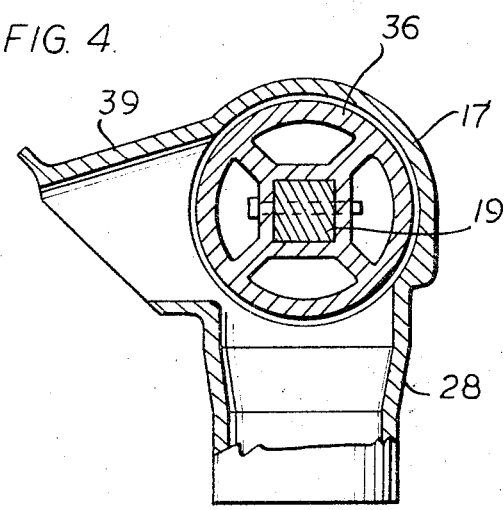
FIGURE 4 is a section taken on the line 4—4 of FIGURE 3.

In the drawings the numeral 10 designates a fertilizer hopper having side walls 11 and 12 and end walls 13 and 14, the side walls converging and forming a rounded bottom in which are secured cylindrical end housings 15 and 16 and a similar cylindrical housing 17 therebetween.

A feed shaft 18 comprises a square shaft 19 extending the full length of the hopper and connected at one end by a coupling 20 to a stub shaft 21 upon which is mounted a sprocket wheel 22 to which drive is transmitted by any well known means to revolve shaft 19.

Bearings 23 and 24 are mounted on the ends of shaft 19 in housings 15 and 16, respectively, and upon the shaft are mounted a plurality of auger sections such as 25 and 26 in the form of sleeves having square bores to receive shaft 19.

A plurality of discharge outlets in the hopper, such as 27, 28 and 29 are connected by flexible guide tubes 30 to suitable furrow forming devices, not shown.

While three discharge outlets are shown in the bottom of the hopper in FIGURE 1, for a two row implement only two of the outlets are in use at any one time, depending upon the row spacing between the earth-working units. In the instance illustrated in FIGURE 1, one end outlet 29 is closed by a plug 31 and all of the material in the hopper is fed to the outlets 27 and 28. Auger sections 25 and 26 feed toward the discharge outlet 28, and so do additional auger sections 32 and 33, the latter revolving in housing 16, and the former being separated by a spacer 34 from an auger section 35, part of which revolves in housing 15, and advances the fertilizer or other material to outlet 27.

Auger sections 25 and 26 feed material from opposite directions inwardly toward outlet 28 and material such as fertilizer tends to accumulate inside the housing and under the auger sections to press upwardly against the feed shaft, distorting it and causing it not only to bind against the inner wall of housing 17 but also to change the rate of flow of material to outlet 28. To overcome this tendency a centering device is provided in the form of a roller 36 having an axial bore conforming to the shape of shaft 19 and mounted on the shaft for rotation therewith. The diameter of roller 36 is greater than the auger spirals 37 and 38 projecting from the surface of auger sections 25 and 26, respectively, and is engageable with the inner surface of housing 17 to prevent bending and distortion of the feed shaft. An overflow opening 39 being provided in housing 17 angularly displaced from outlet 28 lets fertilizer or the like flow out opening 39 if outlet 28 becomes plugged.

It should be clear that with the present invention feed shaft 18 along with auger spirals 37 and 38 remain throughout a dispensing operation in substantial alignment with the axis of cylindrical housing 17 so that material in hopper 10 is fed inwardly at a uniform rate by auger sections 25 and 26.

It is believed that the construction and operation of the novel feed shaft centering means of this invention should be clearly understood from the foregoing description. It should likewise be understood that the invention has been described in its preferred embodiment and that modifications may be made therein without departing from the spirit of the invention or the scope of the appended claims.

What is claimed is:

1. In a material dispenser for fertilizer and the like, an elongated hopper having outlets in the bottom thereof medially of its ends for the discharge of material from the hopper, an elongated feed shaft substantially coextensive with said hopper and rotatably supported at its ends in said hopper, a plurality of cylindrical housings mounted in the bottom of said hopper over said discharge openings and having axial openings of greater diameter than said feed shaft and rotatably receiving said shaft, and means for centering and preventing vertical movement of said shaft resulting from accumulation of said material in said housing comprising, a cylindrical member of greater diameter than and mounted on said shaft and operable during rotation of said feed shaft to engage the interior of the housing upon excessive fertilizer buildup and thereby center the shaft and maintain a uniform rate of feed of said material to said outlets.

2. The invention set forth in claim 1, wherein one of said cylindrical members is mounted in the bottom of the hopper adjacent each end thereof and one is disposed in the hopper medially of its ends and said centering device is mounted on the feed shaft inside said medially disposed cylindrical member.

3. The invention set forth in claim 2, wherein said centering device is a cylindrical roller mounted on and rotatable with said feed shaft and is disposed in alignment with the associated material discharge outlet.

4. The invention set forth in claim 3, wherein said feed shaft comprises a central drive shaft on which is mounted a plurality of auger sections rotatable with the drive shaft, said auger sections being arranged to feed material from the hopper to each of said discharge outlets.

References Cited

UNITED STATES PATENTS

| | | | |
|---|---|---|---|
| 1,098,873 | 6/1914 | Allen | 198—217 |
| 2,641,356 | 6/1953 | Hunter et al. | 198—217 |
| 3,180,525 | 4/1965 | Fabian et al. | 222—412 X |

ROBERT B. REEVES, *Primary Examiner.*

NORMAN T. STACK, JR., *Assistant Examiner.*

U.S. Cl. X.R.

198—217